Sept. 30, 1952 G. HERBSTER Re. 23,560

VENTILATOR

Original Filed May 23, 1941 5 Sheets-Sheet 1

INVENTOR.
GEORGE HERBSTER

BY John H. Leonard, his attorney.

VENTILATOR

Original Filed May 23, 1941 5 Sheets-Sheet 2

INVENTOR.
GEORGE HERBSTER
BY John H. Ramsey,
his attorney.

VENTILATOR

Original Filed May 23, 1941 5 Sheets-Sheet 3

INVENTOR.
GEORGE HERBSTER

BY John H. Raymond, his attorney.

VENTILATOR

Original Filed May 23, 1941 5 Sheets-Sheet 4

INVENTOR.
GEORGE HERBSTER
BY
John H. Lemmon Jr. his Attorney.

VENTILATOR

Original Filed May 23, 1941 5 Sheets-Sheet 5

INVENTOR.
GEORGE HERBSTER

BY John H. Lemmerk, his attorney.

Reissued Sept. 30, 1952

Re. 23,560

UNITED STATES PATENT OFFICE 23,560

VENTILATOR

George Herbster, Cleveland, Ohio, assignor, by mesne assignments, to Barber-Colman Company, Rockford, Ill.

Original No. 2,355,294, dated August 8, 1944, Serial No. 394,811, May 23, 1941. Application for reissue June 19, 1952, Serial No. 294,524

7 Claims. (Cl. 98—87)

Matter enclosed in heavy brackets [ ] appears in the original patent but forms no part of this reissue specification; matter printed in italics indicates the additions made by reissue.

This invention relates to a ventilator, and particularly a ventilator for door panels and other walls of a room in which an opening is provided affording passage of air into and out of the room. The present invention is an improvement on the inventions shown and described in my copending application Serial No. 381,874, filed March 5, 1941, *now Patent #2,378,012.*

One of the principal objects of the present invention is to provide a ventilator in which both the amount of air and the velocity of the air admitted can be controlled.

Another object is to provide a ventilator affording a relatively direct passage for air through the opening with which the ventilator is associated and which obstructs vision through the opening in all positions of the ventilator.

Another object is to provide a vision obstructing ventilator for a wall opening and which obstructs vision through the opening except at a limited location at which substantial visibility is afforded through the ventilator in one direction only.

A more specific object is to provide a ventilator having decorative grills which are exposed at one or both sides of the wall and in which the control of the air passage therethrough is effected by relative movement of various portions of the decorative grill itself.

Other objects and advantages will become apparent from the following specification wherein reference is made to the drawings in which—

Figure 1:
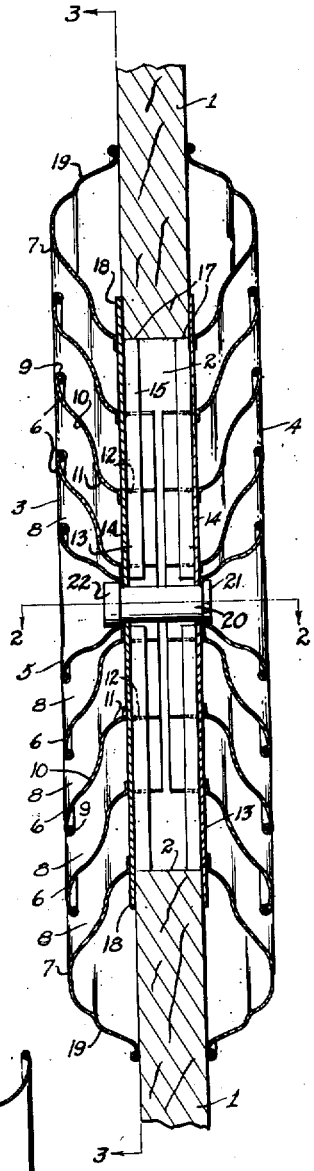
Figure 1 is a sectional view through the axis of a ventilator embodying the principles of the present invention and showing the ventilator installed in a door panel.
Figure 2:
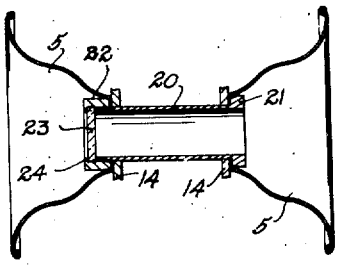
Fig. 2 is an enlarged axial sectional view taken on the line 2—2 in Fig. 1.

Referring to the drawings, the ventilator is shown connected to a wall having an opening through which air can be admitted or discharged. The wall shown for purposes of illustration is a door panel 1 having an opening 2 therethrough, the opening preferably being circular.

The ventilator comprises an inner grill, designated generally at 3, and an outer grill 4. Since the grills 3 and 4 are the same in all respects, the grill 3 only is described in detail.

Referring for purposes of illustration to the grill 3, this grill comprises a plurality of frustoconical vanes arranged with their smaller bases toward the wall opening, and preferably in substantially the same plane and with their larger bases disposed away from the wall opening. The grill 3 has a central vane 5 with a plurality of intermediate vanes 6 and an outer vane 7. The vanes are arranged in coaxial relation with respect to each other and are spaced apart radially so as to provide passages 8 for air therebetween.

Referring to one of the vanes 6 as typical of the vanes, it comprises a metal annulus stiffened at the periphery of its larger base by a suitable bead 9. The vane 6 has a wall 10 convex outwardly from the axis of the vane adjacent the periphery of the large base, then concave, and finally convex at and adjacent the smaller base, as indicated at 11, and substantially cylindrical at the region of the smaller base.

The vanes are preferably so disposed that the convex wall portions of each are exposed almost opposite the convex wall portions of the other in a direction at right angles to the path of the air therethrough so as to reduce to a minimum the possibility of exposing the interior of the ventilator to an observer. Likewise, on the inner base of each vane is a cylindrical portion or extension 12 which extends inwardly and terminates a short distance from the median line of the wall opening.

Figure 3:
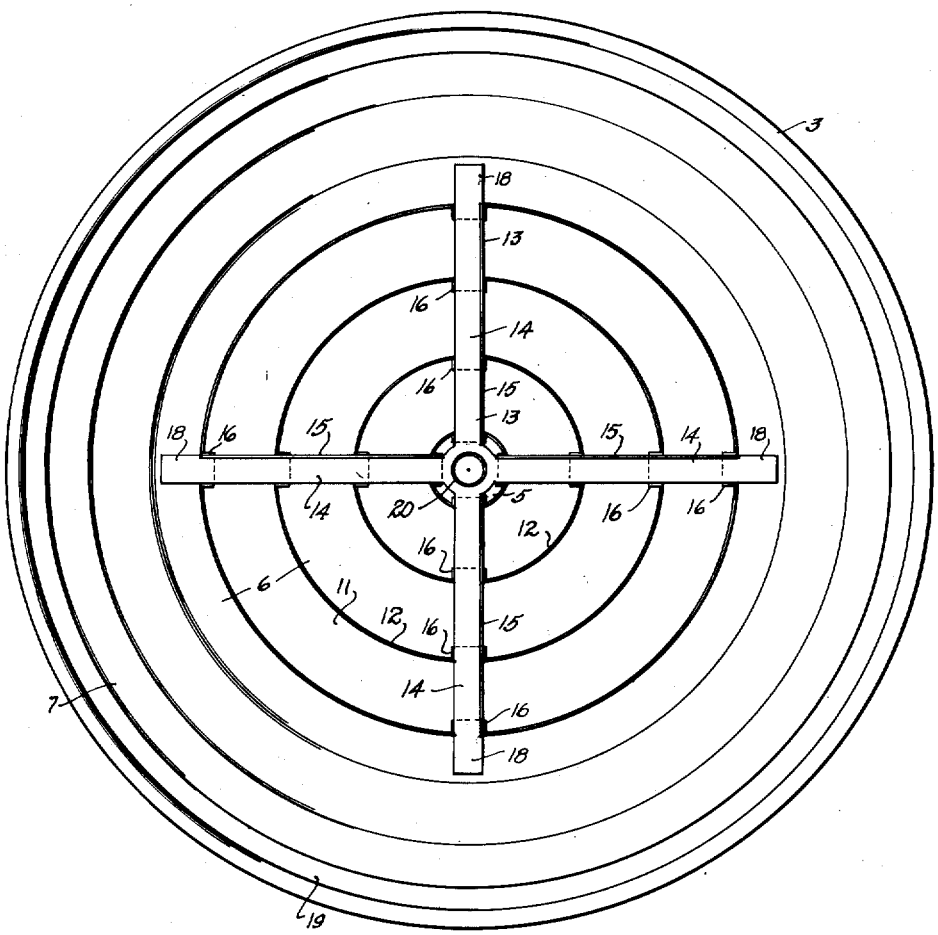
Fig. 3 is a view of the rear face of one of the grills and is taken along the line 3—3 in Fig. 1.
Figure 9:
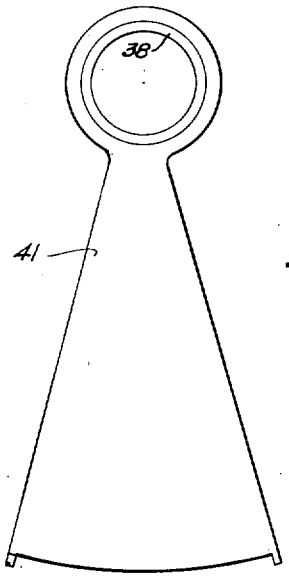
Fig. 9 is a plan view of one of the damper vanes.

The annular vanes are secured in the desired radially spaced and coaxial relation to each other by means of a supporting spider 13 which is better illustrated in Fig. 3. This spider comprises a plurality of radial arms 14 having rearwardly extending flanges 15. The extension 12 of all of the vanes except the central vane 5 are slit from their ends and the metal thereof folded back to provide a notch for accommodating the arms 14, the folded metal providing ears 16 which lie in juxtaposition to the arms 14 and are spot welded or otherwise securely fastened thereto. Thus, the arms 14 support the vanes of the grill fixedly in the relation desired.

At the radially outwardly ends of the arms 14, the flanges 15 are cut back a short amount so that the ends of the flanges fit snugly against the peripheral wall of the wall opening 2 at its diameter, as indicated at 17. The portion of the arms 14 beyond the ends of the cut-back flanges engages the surface of the wall adjacent to the opening, as indicated at 18. For decorative purposes, the outermost vane 7 has a reversely extending outward extension 19 which, when the ventilator is assembled in the wall opening, bears against the wall surface a distance radially outwardly from the opening. The grills 3 and 4 are the same in all respects and are fastened on opposite sides of the wall in axial alignment, each vane of one grill being aligned with a corresponding vane of the same size of the other grill. In order to clamp the grills in a position tightly against the wall while they are centered in the opening by the ends of the flanges 15, a rigid tubular member 20 is placed through a central opening of the central vane 5 of the grill 3 and the corresponding central vane of the grill 4, the spider 13 and the spider of the grill 4 having corresponding central openings for affording passage of the tubular member 20. The member 20 is provided with an integral outwardly extending flange 21 at the end which is disposed to the outer side of the wall. The tubular member 20 is inserted from the outer side, or from the grill 4 in the embodiment illustrated in Fig. 1, and extends through the central vane of the grill 4, the grill spiders, and the central vane 5 of the grill 3. The tubular member 20 is threaded at its inner end and is secured fixedly in place by an internally threaded cap 22 which is tightened sufficiently to draw the grills and the spider extensions 18 firmly against the opposite sides of the wall 1.

It is apparent that with the grills at opposite sides of the wall providing air passages which are angularly disposed to each other at acute angles vision from one side of the wall to the other through the grill is completely obstructed. However, it is often desirable, especially in apartments and outside doors that the occupant of the room be able to see those at the outside and often it is equally desirable from the standpoint of the occupant that he cannot be seen by an outside party. For this purpose, the outer end of the tubular member 20 is left open. At the inner end, a one-way mirror 23 is interposed between the end of the tube and the overhanging flange 24 of the cap 22 and drawn securely against the inner end of the tube, a suitable resilient gasket being interposed to protect the mirror, if desired. The mirror 23 is positioned with its reflecting face outwardly so that the party to the right of the ventilator in Fig. 1 cannot see through the tubular member 20 but the occupant of the room can see through to the outside.

Figure 7:
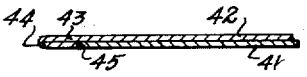
Fig. 7 is a sectional view taken on the line 8—8 of Fig. 5.
Figure 8:
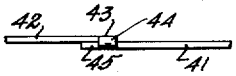
Fig. 8 is an end elevation of two adjacent vanes illustrated in Fig. 6, and showing the position of the same when the ventilator is closed.
Figure 4:
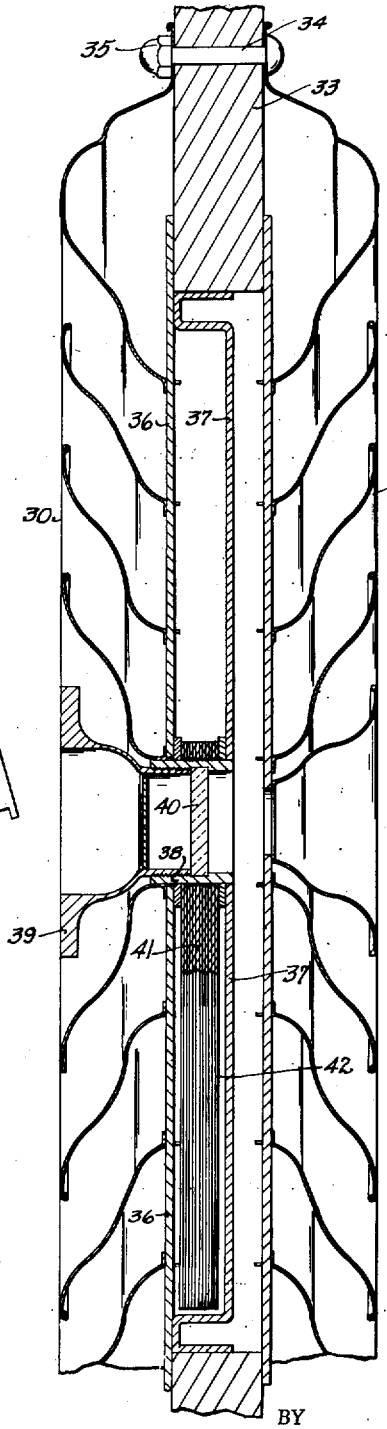
Fig. 4 is an axial sectional view similar to Fig. 1, showing a modification of the structure of the ventilator.
Figure 5:
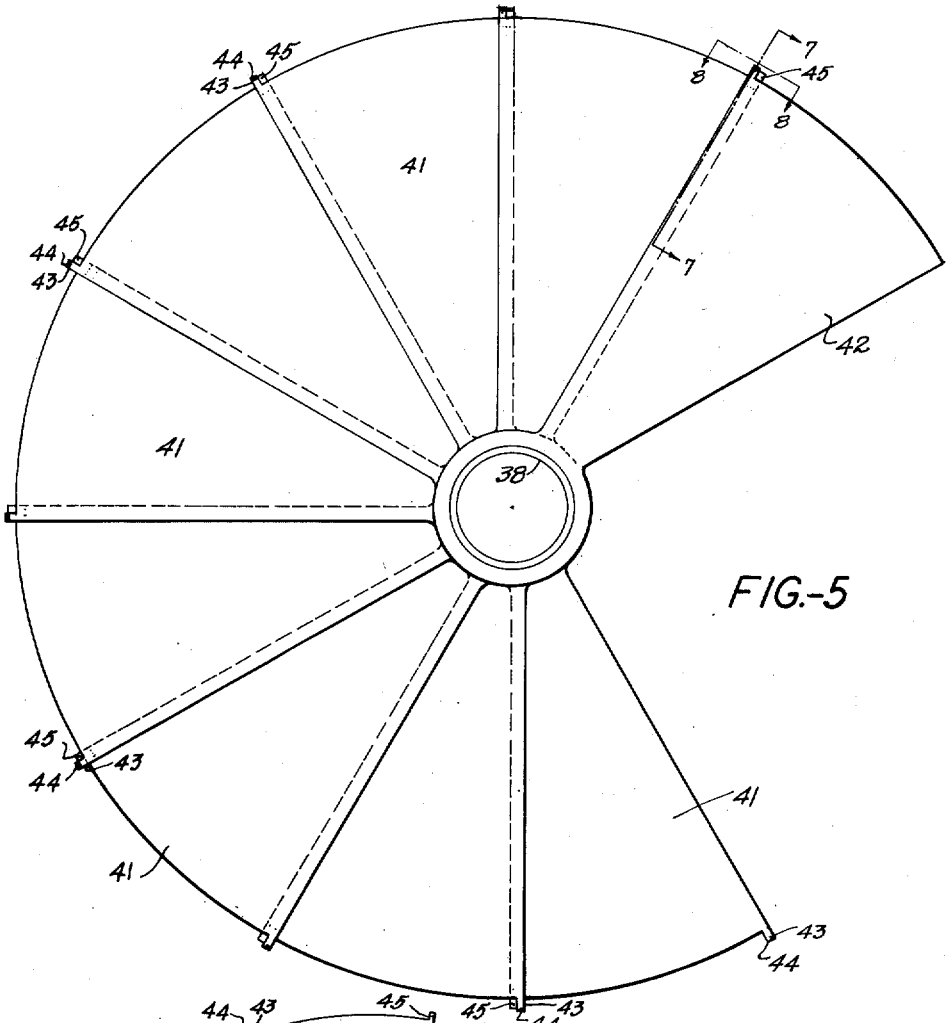
Fig. 5 is a rear elevation of the damper of the ventilator illustrated in Fig. 4.
Figure 6:
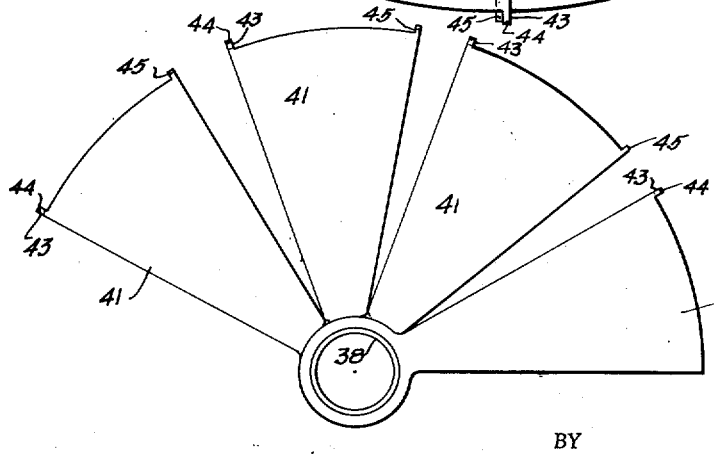
Fig. 6 is a diagrammatic plan view of a number of the ventilator vanes, illustrating the construction thereof.

Referring next to Fig. 4, a pair of grills 30 and 31 are provided, these grills being arranged upon opposite sides of the wall, or door panel, 33. The grills are substantially the same as that described in connection with Fig. 1 except for a damper and the manner of assembly of the grills on the wall. In this form, the device is fastened firmly to the wall by means of suitable bolts 34 and cooperating nuts 35, the nuts being arranged on the inside of the wall so as to prevent removal of the outer grill. Instead of the spider 13, a slightly modified spider is used. The modified spider 36 of the inner grill is provided with a supplemental bracing spider 37. Between the spiders 36 and 37 is provided a space for accommodating damper vanes later to be described. A tubular member 38 is rotatably mounted in the spiders 36 and 37 and is internally threaded for fastening thereinto the central vane 39 of one of the grills of the ventilator, the central vane being somewhat modified to provide a knob for rotating the tube 38. A one-way mirror 40, similar to the mirror 23, is interposed between suitable shoulders on the inner end of the vane 39 and an internal shoulder in the tube 38. Thus upon rotation of the vane 39, the tube 38 is rotated. Mounted on the tube 38 are a plurality of radial damper vanes 41 all of which, with the exception of the right hand vane 42, are rotatable on the sleeve tube 38. As better illustrated in Fig. 6, each of the vanes 41, and also the vane 42, is provided at one end with an extension 43 which is bent downwardly at its end and folded back against the face of the metal to provide a lug 44 as illustrated in Fig. 7, this lug being arranged at the trailing end of the associated blade in the direction of rotation for closing. At its leading end in the direction of rotation for closing the damper is a lug 45 which is coplanar with the blade and is preferably in the form of a slight radial extension of the metal. Thus by rotation of the right hand vane of the group, the lug 44 of each blade engages the lug 45 of the next succeeding blade and draws it along with it on its path of rotation. Thus by rotating the central vane 39, all of the damper blades 41 and the damper blade 42 can be moved from a relatively stacked position fanwise about the axis of the ventilator, thus closing the passage between the grills. Upon rotation of the vane 42 in the opposite direction to open the ventilator, the lugs 44 successively engage each other and move the blades to the relatively stacked position illustrated in Fig. 4.

For purposes of assembly, the grill 31 and its spider are assembled separately from the grill 30 and its dual spiders 36 and 37. Both grills are centered in the opening in coaxial alignment as described in connection with Fig. 1. Then the bolts 34 are inserted and by means of the nuts 35 the grills are drawn tightly against opposite faces of the wall opening, the radially outward ends of the spiders engaging the wall adjacent to the openings.

Figure 10:
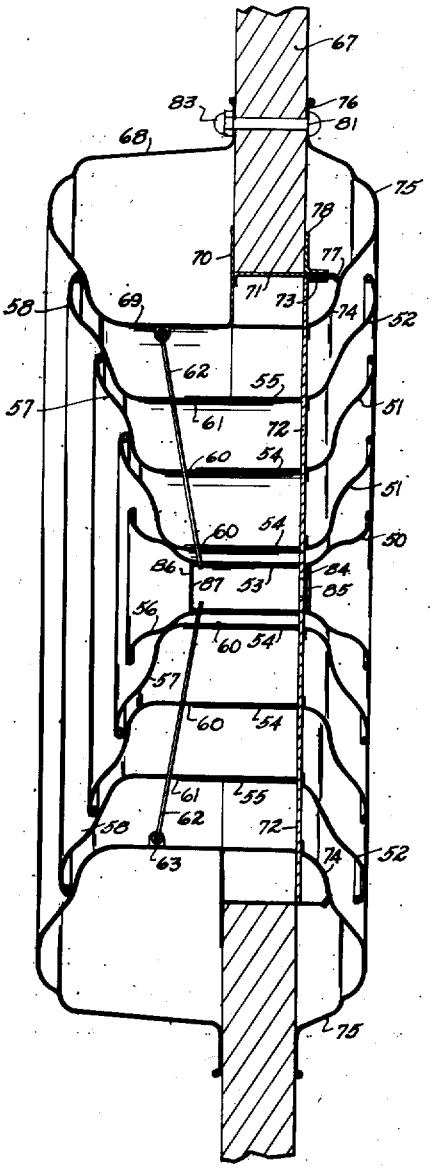
Fig. 10 is an axial sectional view similar to Fig. 1, illustrating another modification of the invention.
Figure 11:
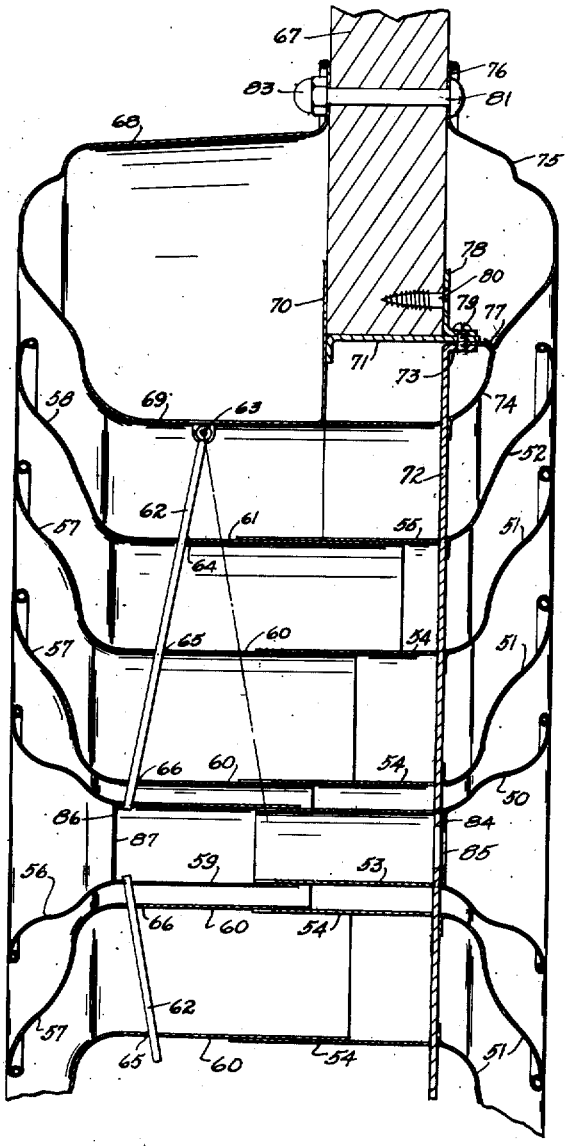
Fig. 11 is an enlarged fragmentary axial sectional view of the structure illustrated in Fig. 10.

Referring next to Figs. 10 and 11, a ventilator adapted to control not only the total amount of the openings but to reduce the openings proportionately is illustrated.

In the form illustrated in Figs. 10 and 11, the outer grill comprises a plurality of vanes such as heretofore described including a central vane 50, intermediate vanes 51 and an outer vane 52, these vanes being arranged in coaxial spaced relation to each other. At their inner ends, the vanes 50, 51 and 52 have axially elongated cylindrical sleeve portions 53, 54 and 55. The inner grill comprises a central vane 56, intermediate vanes 57, and an outer vane 58, which likewise have integral cylindrical sleeve portions 59, 60 and 61, the sleeve portions of the corresponding vanes of the inner grill and outer grill being telescopically mounted with respect to each other so that when the outer grill is supported in place in a door opening, each vane thereof supports a corresponding inner vane of the inwardly disposed grill. Thus each of the vanes 56, 57 and 58 of the inner grill can be moved axially while maintained in coaxial alignment with the corresponding vanes of the outer grill. This arrangement is such that the vanes of the inner grill can be moved inwardly until each engages the radially outward adjacent vane, thus completely closing the passage between the vanes.

It is desirable, however, that each of the passages through the inner grill be opened and closed a proportionate amount with the other passages of the inner grill so that both the amount and velocity of air therethrough can be controlled. For this purpose a differential movement device is provided and operatively connects all of the vanes of the inner grill to the central vane 56 thereof. A simple differential movement device may comprise a rod 62 which is pivoted radially outwardly from the vanes on a pivot 63 so as to swing toward and away from the plane of the opening in the wall. The rod 62 extends with a slightly loose fit, with reasonable play, through openings or slots 64, 65 and 66 in the radially outer vane 58, and the intermediate vanes 57, and into a similar aperture in the central vane 56. Thus, by movement of the central vane inwardly and outwardly, each of the other vanes is moved inwardly and outwardly in a manner such that the passages between the vanes are increased and decreased about the same amount relative to each other for all movements of the central vane. In order to secure the grills to the wall, such as the door panel 67, a frame member 68 is provided for the inner grill and has an inwardly extending wall 69 on which the pivot 63 is supported. The inner wall terminates in a flange 70 which is arranged to lie against the inner face of the door panel 67 for locating the inner grill the proper distance. Secured to the radial flange 70 are braces 71 which extend parallel to the axis of the grill and which are of sufficient length to extend through the opening beyond the opposite wall of the door panel. This assemblage is made prior to installation.

The outer grill is assembled on a suitable spider 72 having at its outer ends flanges 73 which are aligned radially of the grills with the outer end of the bracket 71 when the grills are installed. A framing member 74 is secured to the spider 72 and one end thereof overlies the flange 73. A supplemental framing member 75 is provided and has a radial outward flange 76 aligned with the flange of the frame member 68 when the grills are installed in proper alignment. The supplemental framing member 75 also has an inner flange 77 adapted to abut the outer wall of the frame member 74 when the grill and frame members are installed.

In assembling the device on the door or wall, the inner grill, including the flange 70 and the brackets 71, is inserted in the opening in proper position and temporarily held in proper position by the brackets 71. Next the outer grill is positioned in place, the vanes thereof being telescoped relative to the vanes of the inner grill. In this position the flange 73, the overhanging edge of the frame member 74, and the outer end of the bracket 71 [and] *are* aligned with each other. A bracket 78 is positioned so that one portion overlies the outer end of the bracket 71 and through the [brackets] *bracket* 78 and bracket 71 and flange 73 and the frame member 74, a suitable screw 79 is inserted. The bracket 78 is then secured to the door panel by a suitable screw or other means 80. It is to be understood that a plurality of the brackets 71, flanges 73, and brackets 78 are provided for the purpose of firmly securing the grills in operating position.

Next the supplemental frame member 75 is placed in position with the screw holes in the flange 76 thereof aligned with corresponding holes in the flange of the member 68 and bolts 81 then are passed therethrough and drawn tightly in place by nuts 83, the nuts being arranged on the inside of the door. Thus the device is assembled in proper position.

Instead of the one-way sight heretofore provided, a plate 84 is secured across the bottom or inner base of the central vane 50 of the outer grill and this plate is provided with a relatively large aperture 85. A plate 86 is secured in the smaller base of the vane 56 of the inner grill and has a much smaller aperture 87 therein, the apertures 85 and 87 being axially aligned with each other. Thus a relatively wider range of vision is afforded by looking from the aperture 87 through the aperture 85 than in the opposite direction and substantially no vision is provided through the small aperture 87 from outside the door.

From the foregoing it is apparent that a grill is provided which is decorative, affords adequate passage of air and by which the volume and velocity of the air admitted or discharged can be controlled. Furthermore, the grill obstructs vision through the opening with which it is associated, except for the special one-way visibility afforded to the occupant of the room.

Having thus described my invention, I claim:

1. A vision obstructing ventilator for an opening in a wall and comprising a pair of grills, each grill comprising a plurality of generally frusto-conical annular vanes, means supporting the vanes in coaxial relation to each other and spaced apart radially from each other to define annular passages for air between adjacent vanes, the vanes having their smaller bases at the inner end of each grill and their larger bases at the outer end, the radially outward edge of each vane lying radially outwardly beyond the radially inward edge of the next adjacent radially outward vane, said grills being adapted to overlie the opening when they are disposed in axial alignment on opposite sides of the wall opening with their inner ends facing each other, window means in the center vane affording greater vision therethrough in one direction axially of the grills than in the opposite direction, and means securing the grills in axial alignment with their inner ends facing each other.

2. A vision obstructing ventilator for an opening in a wall and comprising a pair of grills, each grill comprising a plurality of frusto-conical annular vanes arranged in coaxial relation to each other and spaced apart radially from each other to define annular passages for air between adjacent vanes, said grills being adapted to overlie the opening when they are disposed in axial alignment on opposite sides of a wall opening, and supporting members connected to the grills for supporting the vanes thereof in said coaxial relation and extending radially beyond the radially outermost limits of the vanes for engagement with the opposite faces of the wall adjacent the wall opening, and means connected to the grills for drawing the same relatively toward each other to effect clamping engagement of the members with the wall.

3. A vision obstructing ventilator for an opening in a wall and comprising a pair of grills, each grill comprising a plurality of generally frustoconical annular vanes, means supporting the vanes in coaxial relation to each other and spaced apart radially from each other to define annular passages for air between adjacent vanes, the vanes having their smaller bases at the inner end of the grill and their larger bases at the outer end, the radially outward edge of each vane lying radially outwardly beyond the radially inward edge of the next adjacent radially outward vane, said grills being adapted to overlie the opening when they are disposed in axial alignment on opposite sides of the wall opening with their inner ends facing each other, the central vanes of the grill having aligned central apertures, a rigid tube connected at one of its ends to the central vane of one of the grills and coaxial with the grills, and having its ends open and aligned with the apertures, and means for connecting the other end of the tube to the central vane of the other grill.

4. A ventilator for an opening in a wall and comprising a pair of grills, each grill comprising a plurality of generally frusto-conical annular vanes, means supporting the vanes in coaxial relation to each other and spaced apart radially from each other to define annular passages for air between adjacent vanes, the vanes having their smaller bases at the inner end of the grill and their larger bases at the outer end, the radially outward edge of each vane lying radially outwardly beyond the radially inward edge of the next adjacent radially outward vane, said grills being adapted to overlie the opening when they are disposed in axial alignment on opposite sides of the wall opening with their inner ends facing each other, means securing the grills in axial alignment with their inner ends facing each other, and damper means interposed between the grills for controlling the passage of air through the aligned passages of the grills.

5. In a grill comprising a plurality of coaxial annular vanes spaced apart radially and so arranged as to provide passages for air between the vanes, the combination of means supporting the central vane for rotation about the common axis, rotatable damper vanes, means supporting the damper vanes for rotation about the grill axis to open and closed positions relative to the passages through the grill, and means operatively connecting the damper vanes and said rotatable central vane for operating the damper vanes to open and closed positions.

6. A ventilator for an opening in a wall and comprising a pair of grills adapted to be located at opposite sides of such opening in alignment therewith, each grill comprising a plurality of generally frusto-conical annular vanes arranged in coaxial relation to each other and spaced apart radially from each other to define annular passages for air through such wall opening between adjacent vanes, the vanes having their smaller bases at the inner end of the grill and their larger bases at the outer end of the grill, the radially outward edge of each lying radially outwardly beyond the radially inward edge of the next adjacent radially outward vane, means supporting one of said grills with the vanes thereof in said coaxial relation, axially inwardly extending means on the vanes of the supported grill, means on the vanes of the other grill and telescopically engaged with the last mentioned means for telescopically supporting the vanes of the other grill for axial movement of the vanes of said other grill relatively inwardly into said nesting relation with respect to each other.

7. A ventilator for an opening in a wall and comprising a plurality of generally frusto-conical annular vanes, in coaxial relation to each other and normally spaced apart radially from each other to define annular passages for air between adjacent vanes, and with the smaller bases of the vanes at one end of the grill and their larger bases at the other end and with the radially outward edge of each vane lying radially outwardly beyond the radially inward edge of the next adjacent radially outward vane, means supporting the vanes in said coaxial relation and for independent axial movement, differential movement means operatively connecting the vanes to the central vane for movement of the vanes axially to their open positions upon movement of the central vane to open position, said differential movement means comprising a rod connected to the central vane for swinging thereby upon axial movement of the central vane, means pivotally supporting the rod to swing about an axis positioned radially outwardly from the vanes and extending in a direction [parallel to] *at right angles to* the axis of the grill, and means connecting the remaining vanes to the rod at different distances from the pivotal axis, respectively.

GEORGE HERBSTER.

REFERENCES CITED

The following references are of record in the file of this patent or the original patent:

UNITED STATES PATENTS

| Number | Name | Date |
|---|---|---|
| 290,084 | Maxfield | Dec. 11, 1883 |
| 711,179 | Sanders | Oct. 14, 1902 |
| 1,111,805 | Pykett | Sept. 29, 1914 |
| 1,608,638 | Weyant | Nov. 30, 1926 |
| 1,650,444 | Guyer | Nov. 22, 1927 |
| 1,676,140 | Frankel | July 3, 1928 |
| 1,737,610 | Norton | Dec. 3, 1929 |
| 2,125,454 | Marshall | Aug. 2, 1938 |
| 2,189,502 | Johnston | Feb. 6, 1940 |
| 2,229,747 | Kurth | Jan. 28, 1941 |
| 2,252,264 | Kurth | Aug. 12, 1941 |
| 2,255,850 | Kurth | Sept. 16, 1941 |
| 2,258,731 | Blumenthal | Oct. 14, 1941 |
| 2,307,586 | Herbster | Jan. 5, 1943 |

FOREIGN PATENTS

| Number | Country | Date |
|---|---|---|
| 193,496 | Great Britain | Feb. 26, 1923 |
| 365,048 | Great Britain | Jan. 11, 1932 |
| 501,402 | Great Britain | Feb. 23, 1939 |